United States Patent
Glen

(10) Patent No.: US 6,268,847 B1
(45) Date of Patent: Jul. 31, 2001

(54) METHOD AND APPARATUS FOR MORE ACCURATE COLOR BASE CONVERSION OF YUV VIDEO DATA

(75) Inventor: David I. J. Glen, Toronto (CA)

(73) Assignee: ATI International SRL, Hastings (BB)

( * ) Notice: Subject to any disclaimer, the term of this patent is extended or adjusted under 35 U.S.C. 154(b) by 0 days.

(21) Appl. No.: 09/324,211

(22) Filed: Jun. 2, 1999

(51) Int. Cl.[7] .................................................. G09G 5/04
(52) U.S. Cl. ........................... 345/154; 345/155; 348/599
(58) Field of Search .................................... 345/154, 150, 345/151, 152, 153, 51, 22, 72, 88, 431; 340/815.65, 815.56, 815.66, 815.89; 348/181, 189, 599, 661

(56) References Cited

U.S. PATENT DOCUMENTS

| | | | |
|---|---|---|---|
| 5,124,688 | * 6/1992 | Rumball | 345/154 |
| 5,838,299 | * 11/1998 | Smith et al. | 345/137 |
| 5,872,556 | * 2/1999 | Rackley et al. | 345/154 |
| 5,920,340 | * 7/1999 | Man et al. | 348/181 |
| 5,936,683 | * 8/1999 | Lin | 348/659 |
| 6,025,885 | * 2/2000 | Deter | 348/661 |
| 6,157,415 | * 12/2000 | Glen | 348/599 |

OTHER PUBLICATIONS

Gordon, B., the non-patent reference, "A low-power multiplierless YUV to RGB converter based human vision perception", Oct. 1994, IEEE, pp. 408–417.*

Desor, H.–J., the non-patent reference, "Single–chip video processing system", Aug. 1991, IEEE, pp. 182–189.*

* cited by examiner

*Primary Examiner*—Jeffery Brier
*Assistant Examiner*—Thu-Thao Havan
(74) *Attorney, Agent, or Firm*—Markison & Reckamp, P.C.

(57) ABSTRACT

A method and apparatus for improving the quality of video data when displayed on a display device that uses YUV output data to produce a display includes processing that begins by generating expanded RGB data from received RGB data. For example, the RGB data may be 8-bit data and the expanded data is generated by adding bits to it. The processing continues by generating RGB representative data from received YUV data. The RGB representative data is of the same format as the expanded RGB data and has a value range that includes and exceeds the normalized value range of the perceived RGB data. For example, the RGB representative data may have values less than zero and/or greater than 1, or normalized values outside of the zero to 1 range. The processing then continues by mixing the RGB representative data and the expanded RGB data to produce resulting RGB data, which has a similar format as both the expanded RGB data and the RGB representative data. The processing continues by converting the resulting RGB data into RGB output data. Such a conversion involves removing extra bits such that the RGB output data has a normalized value range of the received RGB data (i.e., having RGB component values in the range of zero to 1). The processing then continues by converting the resulting RGB data, which has the expanded RGB format, into YUV output data.

45 Claims, 3 Drawing Sheets

METHOD AND APPARATUS FOR MORE ACCURATE COLOR BASE CONVERSION OF YUV VIDEO DATA

TECHNICAL FIELD OF THE INVENTION

This invention relates generally to video graphics processing and more particularly to color base conversion of YUV and RGB data.

BACKGROUND OF THE INVENTION

Computers are known to include a central processing unit, system memory, peripheral ports, audio processing circuitry, and video processing circuitry. The video processing circuitry receives graphics data from the central processing unit and prepares it for display on a computer monitor, television, and/or LCD panel. The computer generates the graphics data by performing one or more applications such as word processing applications, drawing applications, presentation applications, spread sheets, operating system functionality, etc. The video graphics processing circuit processes the graphics data to produce RGB (red, green, blue) digital data, which may be converted to analog data that is provided to the monitor.

The video graphics circuitry may also include a video decoder and video capture module for processing YUV data. The video decoder is operably coupled to receive video signals from a video source such as a cable box, satellite receiver, antenna, VCR, DVD player, etc. Upon receiving the video signal, which is formatted for a television, the video decoder produces digital representations thereof. The digital representations are stored as YUV data in the video capture module. For the video graphics processor to process the YUV data, it first converts the YUV data into an RGB color base. Once in the RGB color base, the video graphics processor can blend the video data and graphics data to produce an output image.

The output image is in a digital RGB color base format and can be provided directly to an LCD panel or converted to an analog RGB signal via a digital-to-analog converter. If the computer is also providing the output image to a television monitor, the digital RGB color base data is converted to YUV color base data. As such, the video graphics processing circuitry would further include an RGB-to-YUV converter. By converting the video data to an RGB color base and then back to a YUV color base, the quality of the video is degraded in comparison to a non-converted video signal. The degradation occurs due to the methodology for converting YUV data to RGB data and converting RGB data to YUV data. To convert YUV data to RGB data, a number of standardizes sets of equations may be used. For example, either or both of the following sets of equations may be used:

$R = k_Y Y + K_R C_R,$  $\qquad R' = 1.164(Y' - 16) + 1.596(C_R - 128),$ $G = k_y Y - K_{G1} Cr - K_{G2} C_B,$  $\quad G' = 1.164(Y' - 16) -$
$\qquad\qquad\qquad\qquad\qquad 0.392(C_B - 128) - 0.813(C_R - 128),$ $B = k_y Y + K_B C_B.$  $\qquad B'' = 1.164(Y' - 16) + 2.017(C_B - 128).$ As one can see from these equations, the red and blue components of the RGB may exceed the value of 1 while the green component could be less than zero. In processing RGB data, the video graphics processor can only accommodate RGB component values that are between zero and one. As such, there are potential illegal values for R, G and B components, i.e., less than zero and/or greater than one. To compensate for this, the RGB component values are clamped to the zero or 1 threshold when the computed value would exceed the threshold. By clamping these values, resolution of the YUV data is degraded. As such, when the processed RGB data is reconverted to YUV data, the original YUV data may not be recaptured if it produced an RGB component value that exceeded the RGB thresholds.

Therefore, a need exists for a method and apparatus that allows more accurate—YUV-to-RGB back to YUV conversions to enhance the quality of video data when displayed on a device that uses YUV type output data (e.g., a television, a VCR, etc.).

DETAILED DESCRIPTION OF A PREFERRED EMBODIMENT

Generally, the present invention provides a method and apparatus for improving the quality of video data when displayed on a display device that uses YUV output data to produce a display. Such a method and apparatus includes processing that begins by generating expanded RGB data from received RGB data. For example, the RGB data may be 8-bit data and the expanded data is generated by adding bits to it. The processing continues by generating RGB representative data from received YUV data. The RGB representative data is of the same format as the expanded RGB data and has a value range that includes and exceeds the normalized value range of the perceived RGB data. For example, the RGB representative data may have values less than zero and/or greater than 1, or normalized values outside of the zero to 1 range. The processing then continues by mixing the RGB representative data and the expanded RGB data to produce resulting RGB data, which has a similar format as both the expanded RGB data and the RGB representative data. The processing continues by converting the resulting RGB data into RGB output data. Such a conversion involves removing extra bits such that the RGB output data has a normalized value range of the received RGB data (i.e., having RGB component values in the range of zero to 1). The processing then continues by converting the resulting RGB data, which has the expanded RGB format, into YUV output data. With such a method and apparatus, the conversion of video data, which is received in a YUV color base format, is more accurately reproduced by a video graphics processing circuit. This results because the YUV data can be more accurately represented by the RGB representative data, which has an allowable value range that exceeds the normal value range of RGB data. As such, when YUV-converted data exceeds the allowable normal range of RGB data, the data is not clamped, therefore, the accuracy of the YUV data is preserved when reconstructed from RGB data.

Figure 1:
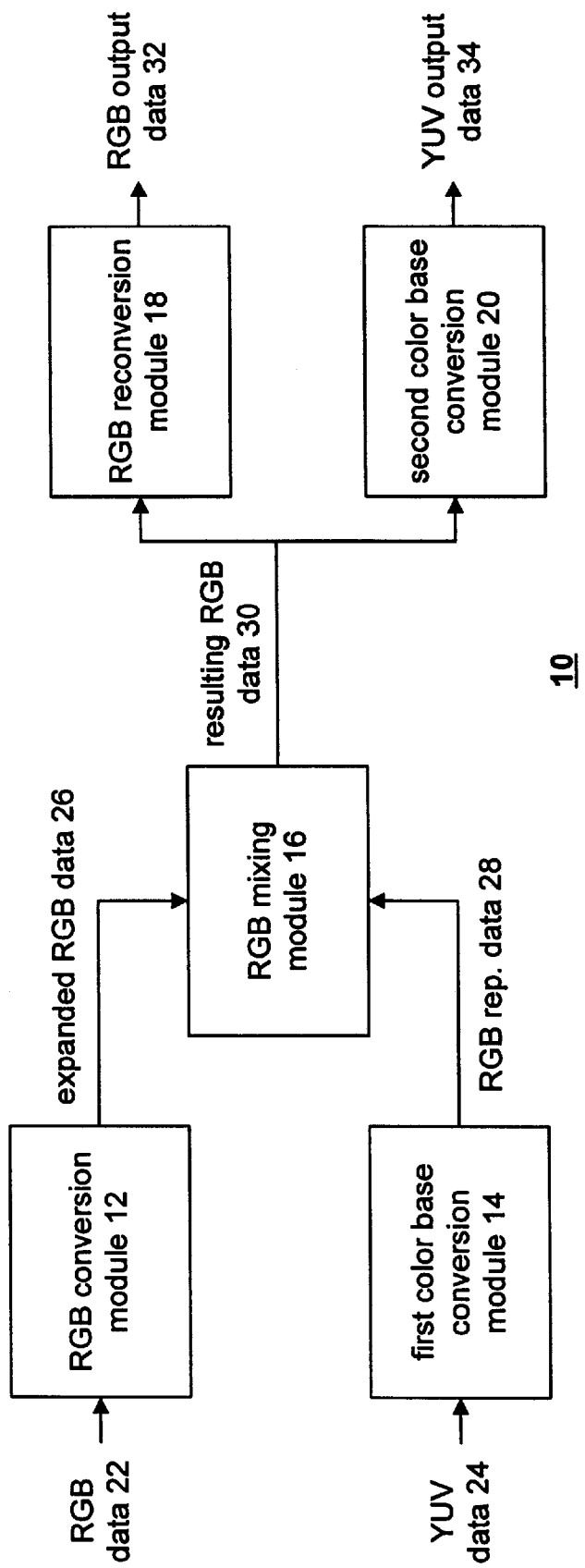
FIG. 1 illustrates a schematic block diagram of a video graphics circuit in accordance with the present invention.

The present invention can be more fully described with reference to FIGS. 1–4. FIG. 1 illustrates a schematic block diagram of a video graphic circuit 10, which may be included in a computer, video game, television set, or any other device that produces video output images. The video graphics circuit 10 includes an RGB conversion module 12, a first color base conversion module 14, an RGB mixing module 16, an RGB reconversion module 18, and a second color base conversion module 20. The RGB conversion module 12 is operably coupled to receive RGB data 22 for any of a plurality of known sources coupled to the device incorporating the video graphics circuit 10. The RGB conversion module 12 converts the received RGB data 22 into expanded RGB data 26, which may be signed data or unsigned normalized data. To produce the signed data, the RGB conversion module 12 includes firmware that produces the expanded RGB data by padding at least one bit to the RGB data. For example, if the RGB component values are each 8-bits each, adding a ninth bit, in the most significant bit position, produces the expanded RGB data. To produce the unsigned normalized expanded RGB data 26, the RGB conversion module 12 includes firmware that produces the expanded RGB data by adding a normalizing offset to each of the R, G and B component values, such that the most negative potential value for any of the components, when normalized, will be a positive value. The normalizing offsets may be obtained by adding, for example, the binary equivalent of 1.5. For example, if the RGB component are each 8-bits, each component would have added to 0×180, thereby producing a 10-bit value. The firmware referred to for the conversion of the RGB data to the expanded RGB data includes a processing module and memory. The processing module may be existing processors within a video graphics circuit or a portion of the processing module as shown in FIG. 3, which will be discussed below.

The first color base conversion module 14 receives YUV data 24, which is video data received from a video source, and produces therefrom an RGB representative data 28. The RGB representative data is of the same format as the expanded RGB data and has a value range that includes and exceeds a normalized value range of the RGB data. Recall that the normalized value range of the RGB data is zero to 1 for each of the RGB component values. As such, the representative RGB data may be equivalent to the unsigned normalized expanded RGB data 26 or the signed expanded RGB data 26. To produce the signed RGB representative data 28, the color base conversion module 14 converts the YUV data 24 directly to the representative data 28 but utilizing, for example, 10-bits per RGB component value. To produce the unsigned normalized RGB representative data 28, the first color base conversion module 14 converts the YUV data 24 to RGB data and then adds the normalizing offset. For example, the first color base conversion module 14 would convert the YUV data 24 into signed 8-bit RGB component values and then add the binary equivalent of 1.5. As such, the signed 8-bit values would have a 0×180 added thereto. Note that the first color base conversion module 14 utilizes the YUV-to-RGB color base conversion equations as previously described in the background without clamping the color space conversion or clamping the expanded range.

The RGB mixing module 16 is operably coupled to receive the expanded RGB data 26 and the RGB representative data 28. The RGB mixing module 16 mixes the data 26 and 28 to produce resulting RGB data 30. The resulting RGB data will be of a similar format as the input data 26 and 28. For example, if the input data 26 and 28 are unsigned normalized values, where the representative RGB data is 12 bits/component and the expanded RGB data is 12 bits/component, the resulting RGB data will have unsigned normalized components, each being 12 bits. Conversely, if the input data 26 and 28 is the signed data, the resulting RGB data 30 will be signed.

The RGB conversion module 18 is operably coupled to receive the resulting data 30 and to produce therefrom RGB output data 32. The RGB output data has each of the RGB component values within the normalized value range of RGB data (i.e., in a range of zero to 1). When the expanded RGB data 26 and RGB representative data 28 are signed values, the RGB reconversion module 18 removes the most significant bits according to the number of bits added to produce the expanded RGB data 26. For example, if the original RGB data 22 contained 8-bit R, G, and B component values, the expanded value would include 10-bits for each of the RGB component values. The resulting RGB data 30 would include 10-bits per RGB component values, therefore, the RGB conversion module 18 removes the two most significant bits.

The RGB reconversion module 18 may also include clamping circuitry that clamps at least one of the R, G, and B component values of the resulting RGB value when the component is of a value that exceeds the normalized value range of the RGB data (e.g., 0 to 1). For 10 bit signed values, the RGB reconversion module 18 utilizes the two most significant bits, assuming a single bit was padded to the RGB data 22, to determine whether clamping should be utilized. For example, when the two most significant bits are 10 or 11, the resulting value is a negative value, therefore the RGB reconversion module 18 will clamp it to zero. When the two most significant bits are 01, the resulting value is greater than 1, therefore, the RGB reconversion module 18 will clamp the value to 1. When the two most significant bits are 00, the RGB reconversion module 18 passes the value with the two most significant bits removed. Note that when the RGB reconversion module 18 performs clamping, it removes the most significant bits to produce the similar format, i.e., bit-size, of the RGB data 32. As one of average skill in the art will readily appreciate, the RGB reconversion module 18 is dependent on the number of bits padded during the RGB conversion module 12 and one the number of bits per component desired in the RGB output data 32.

If the expanded RGB 26 and RGB representative data 28 were unsigned normalized, the RGB reconversion module 18 includes circuitry that removes the normalizing offset value. As such, if the normalized offset was the binary equivalent of decimal 1.5, the RGB reconversion module 18 subtracts this amount from the three most significant bits from the resulting RGB data 30 and may also clamp the resultant. For example, the clamping is done by looking at the three most significant bits of the RGB component values of the resulting RGB data 30. If the three most significant bits of the resulting RGB data 30, assuming a 12-bit per RGB component, are 000, 001, or 010, the resulting RGB data 30 is clamped to 0. If the three most significant bits are 011 or 100, t he resulting RGB data 30 is not clamped. If the three most significant bits are 101, 110, or 111, the resulting RGB data 30 is clamped to 1.

The second color base conversion module 20 is operably coupled to receive the resulting RGB data 30 and to produce therefrom YUV (or YCbCr) output data 34. To produce the YUV output data 34, the second color base conversion module 20 utilizes the following equations:

$Y = C_1 R + C_2 G + C_3 B + C_4;$ $Cb = C_5 R + C_6 G + C_7 B + C_8;$ and $Cr = C_9 R + C_{10} G + C_{11} B + C_{12}$ Assuming that the resulting YUV data 34 is a 10-bit per component resultant, coefficient $C_4$ can be set to 64, coefficient $C_8$ can be set to 512, and coefficient $C_{12}$ can be set to 512. Note that the coefficients are set to the binary equivalents of these decimal values. For shades of grey, the chrominance value equals zero, thus the coefficients $C_5 + C_6 + C_7 = 0$ and $C_9 + C_{10} + C_{11} = 0$. As such, Cb, making the substitutions as indicated, equals $C_5(R-1536) + C_6(G-1536) + C_7(B-1536)$, where 1536 represents a normalized value of 1.5 for a 10-bit value. Continuing the factoring, $Cb = C_5R + C_6G + C_7B + C_7B + 1536 \times (C_5 + C_6 + C_7)$, the last term of which was indicated above to be equal to zero, thus $Cb = C_5R + C_6G + C_7B + C_8$. As such, by utilizing these values within the equation, the equations automatically remove the normalized offset value.

Figure 2:
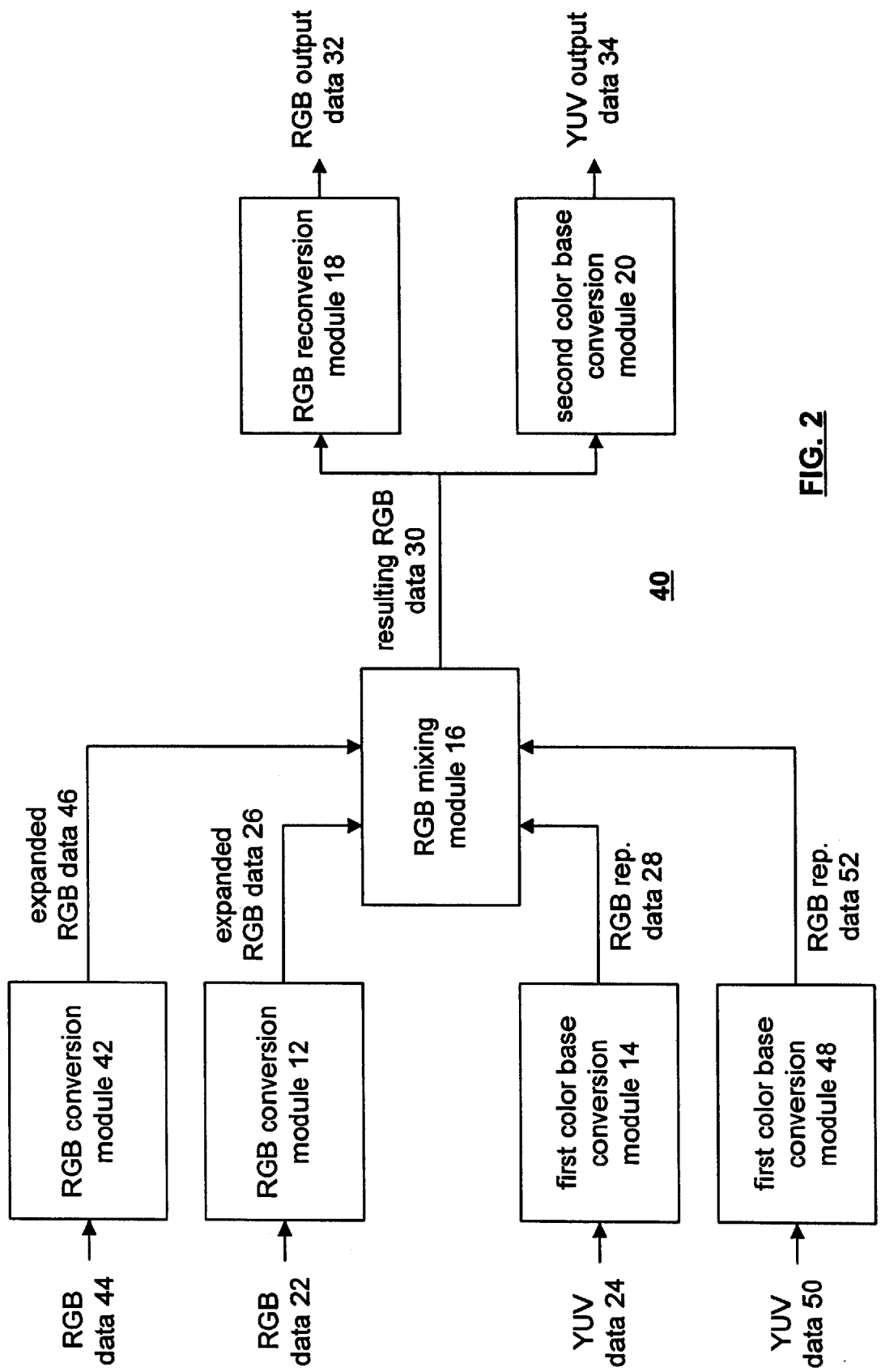
FIG. 2 illustrates a schematic block diagram of another embodiment of a video graphics circuit in accordance with the present invention.
Figure 3:
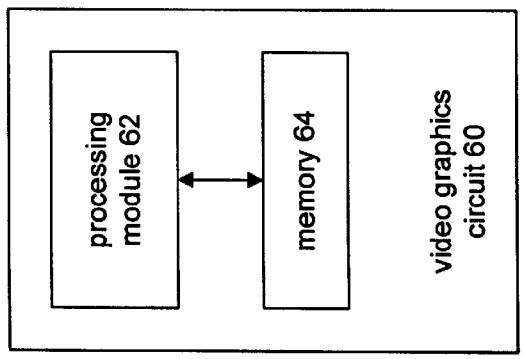
FIG. 3 illustrates a schematic block diagram of yet another embodiment of a video graphics circuit in accordance with the present invention.

FIG. 2 illustrates an alternate embodiment of a video graphic circuit 40 that includes a first RGB conversion module 12, a second RGB conversion module 42, a first color base conversion module 14, another color base conversion module 48, an RGB mixing module 16, the RGB reconversion module 18, and the second color base conversion module 20. In this embodiment, the video graphic circuitry is operably coupled to receive multiple RGB image layers and multiple YUVI image layers. The functionality of the RGB conversion modules 42 and 12 are as discussed with reference to the RGB conversion module of FIG. 1. Similarly, the color base conversion modules 14 and 48 function as described with reference to color base conversion module 14 of FIG. 1. The RGB mixing module mixes the signals of the expaned RGB data 46, the expanded RGB data 26, the RGB representative data 28, and the GB representative data 52 to produce the resulting RGB data 30. The resulting RGB data is processed by the RGB reconversion module 18 to produce RGB output data 32. Such was discussed with reference to FIG. 1. The second color base conversion module 29 receives the resulting RGB data 32 and produces YUV output data 34. Such was also discussed with reference to FIG. 1.

FIG. 3 illustrates a schematic block diagram of a video graphic circuit 60 that includes a processing module 62 and memory 64. The processing module 62 may be a single processing device or a plurality of processing devices. Such a processing device may be a microprocessor, microcomputer, digital signal processors microcontroller, portion of the central processing unit, state machine, logic circuitry, and/or any device that manipulates data based on operational instructions. The memory 64 may be a single memory device or a plurality of memory devices. Such a memory device may be a read-only memory, random access memory, floppy disk memory, system memory, reprogrammable erasable memory, and/or any device that stores operational instructions in a digital format. Note that when the processing module 62 implements one or more of its functions via a state machine and/or logic circuitry, the memory storing the corresponding operational instructions is embedded within the circuitry comprising the state machine and/or logic circuitry. The operational instructions stored in memory 64 and executed by processing module 62 will be discussed in greater detail with reference to FIG. 4.

Figure 4:
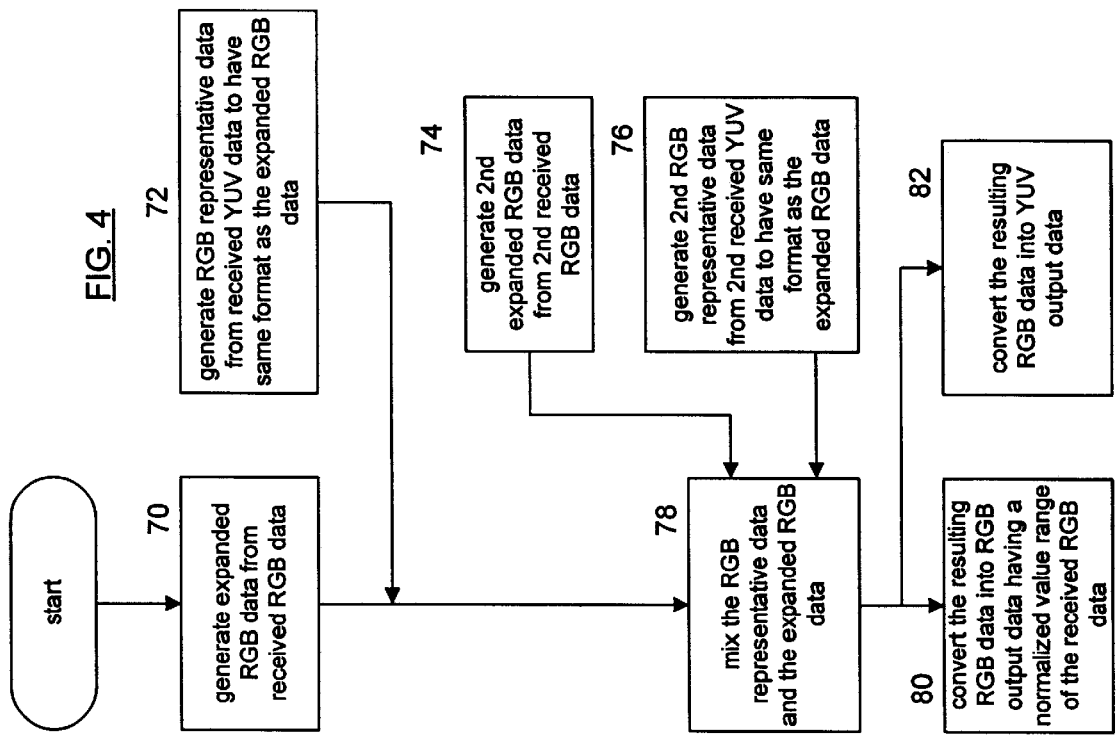
FIG. 4 illustrates a logic diagram of a method for providing enhanced video data on a television monitor in accordance with the present invention.

FIG. 4 illustrates a logic diagram of a method for improving the quality of the video displayed on a computer monitor. The process begins at step 70 where expanded RGB data is generated from received RGB data. The received RGB data is in a normalized value range for RGB data (e.g., zero to 1). The expanded RGB data may be produced by padding the received RGB data with at least one bit to produce a signed expanded value. Alternatively, the expanded RGB data may be produced by adding a normalizing offset (e.g., the binary equivalent of 1.5) to the R, G, and B components of the received RGB value.

The process then proceeds to step 72, or step 72 is performed in parallel with step 70, where RGB representative data is generated from received YUV data. The RGB representative data has the same format (e.g., same number of bits) as the expanded RGB data. Note that the RGB representative data has a value range that includes and may exceed the normalized value range of the RGB data (e.g., allows values greater than 1 and less than zero). If the video graphic circuitry is to process these values utilizing a normalizing offset, the normalizing offset is added to the RGB representative data.

The process of FIG. 4 also includes steps 74 and 76 which are duplicates steps of 70 and 72. Such steps 74 and 76 are included to illustrate that the video graphics circuitry may process multiple RGB image layers and/or multiple video image layers.

The process then proceeds to step 78 where the RGB representative data is mixed with the expanded RGB data. The process then proceeds to step 80 and step 82, where, at step 80, the resulting RGB data is converted into RGB output data, wherein the RGB output data has a normalized value range of the RGB data. At step 82, the resulting RGB data is converted into YUV output data.

If the video graphics circuitry 60 is to perform the process of FIG. 4 utilizing sign-dependent values, the expanded RGB data would be produce by padding at least one bit to the received RGB data. The mixing of the expanded RGB representative data is done in a sign-dependent matter such that the resulting RGB data preserves the sign of the resulting mixing. When the RGB output data is recreated, at least one bit is removed from the resulting RGB data to produce the RGB output data. Typically, if two bits were added to produce the expanded RGB data, zero bits would need to be removed from the RGB output data. In addition, the resulting RGB output data may need to be clamped for one or more of the RGB component values depending on whether the component value exceeds the normalized value range of the RGB data. If so, the appropriate RGB component value is clamped to zero when it is a value less than zero and clamped to 1 when it is of a value greater than 1. When the resulting RGB data is converted into the YUV output data, it is done in a sign dependent matter, i.e., the sign is preserved of the resulting value such that an accurate representation of YUV is recaptured, or created.

When the video graphic circuit 60 is to perform the functionality of FIG. 4 utilizing normalized values, the expanded RGB data is produced by adding a normalizing offset (e.g., the binary equivalent of 1.5) to each of the R, G, and component values of the received RGB data. In addition, the normalizing offset values added to the R, G, and B components' values of the RGB representative data. As such, the YUV to RGB conversion occurs in a normal fashion, using the above reference equation and then the normalizing offset value is added. When the expanded RGB data is mixed with the RGB representative data, this is done in a sign independent manner, and the zero to one limits are ignored. When the RGB output data is reconstructed, it is done so by removing the normalizing offset values from the R, G, and B components of the resulting RGB data. The RGB output data may need to be clamped to either zero or 1 then the RGB component is of a value that exceeds the normalized range for the RGB data. In addition, the normalizing offset value is removed from the resulting RGB data to produce the YUV output data. As such, reconstructed YUV data contains colors that could not be represented if the resulting RGB data 30 was limited to the zero to one range.

The preceding discussion has presented a method and apparatus for a video graphic circuit to provide enhanced video quality when displaying video data. Such is achieved by expanding the allowable values for RGB data such that when YUV data is converted to RGB data and back, the accuracy of the YUV data is not lost. As one of average skill in the art will readily appreciate, other embodiments may be derived from the teachings of the present invention without deviating from the scope of the claims. For example, the normalized offsets may be of the same, or different values, for each color component and/or the RGB output 32 may include more bits than were in RGB data 22.

What is claimed is:

1. A video graphics circuit comprises:
   an RGB conversion module operably coupled to receive RGB data and to produce therefrom expanded RGB data;
   a first color base conversion module operably coupled to receive YUV data and to produce therefrom RGB representative data, wherein the RGB representative data is of a similar format as the expanded RGB data, and wherein the RGB representative data has a value range that includes and exceeds a normalized value range of the RGB data;
   an RGB mixing module operably coupled to mix the RGB representative data and the expanded RGB data to produce resulting RGB data; and
   a second color base conversion module operably coupled to receive the resulting RGB data and to convert the resulting RGB data into YUV output data.

2. The video graphics circuit of claim 1, wherein the format further comprises at least one of: colorimetry, bit size, and a normalizing offset.

3. The video graphics circuit of claim 1 further comprises:
   an RGB reconversion module operably coupled to receive the resulting RGB data and to convert the resulting RGB data into RGB output data, wherein the RGB output data has the normalized value range of the RGB data; and
   a second RGB conversion module operably coupled to receive second RGB data and to produce therefrom a second expanded RGB data, wherein the RGB mixing module mixes the second expanded RGB data with the expanded RGB data and with the RGB representative data.

4. The video graphics circuit of claim 3, wherein the second RGB data further comprises a hardware cursor.

5. The video graphics circuit of claim 1 further comprises a third color base conversion module operably coupled to receive second YUV data and to produce therefrom second RGB representative data, wherein the second RGB representative data is provided to the RGB mixing module for mixing with the RGB representative data and the expanded RGB data.

6. The video graphics circuit of claim 1, wherein the RGB conversion module further comprises firmware that produces the expanded RGB data by padding at least one bit to the RGB data.

7. The video graphics circuit of claim 6, wherein the RGB mixing module further comprise sign dependent mixing circuitry for mixing the expanded RGB data and the RGB representative data.

8. The video graphics circuit of claim 6, wherein the RGB reconversion module further comprises circuitry for removing at least one bit from the resulting RGB data to produce the RGB output data.

9. The video graphics circuit of claim 6 further comprises:
   an RGB reconversion module operably coupled to receive the resulting RGB data and to convert the resulting RGB data into RGB output data, wherein the RGB output data has the normalized value range of the RGB data, wherein the RGB reconversion module further comprises a clamping circuit operably coupled to receive the resulting RGB data and to clamp at least one of R, G, and B components of the resulting RGB data when the at least one R, G, and B component is of a value that exceeds the Formalized value range of the RGB data.

10. The video graphics circuit of claim 6, wherein the second color base conversion module further comprise sign dependent circuitry for converting the RGB output data into the YUV output data.

11. The video graphics circuit of claim 1, wherein the RGB conversion module further comprises firmware that produces the expanded RGB data by adding a normalizing offset to R, G, and B components of the RGB data.

12. The video graphics circuit of claim 11, wherein the normalizing offset further comprises a single value for the R, G, and B components or a separate value for one or more of the R, G, and B components.

13. The video graphics circuit of claim 11, wherein the first color base conversion module adds a normalizing offset to the R, G, and B components of the RGB representative data.

14. The video graphics circuit of claim 13, wherein the RGB mixing module further comprise sign independent mixing circuitry for mixing the expanded RGB data with the RGB representative data.

15. The video graphics circuit of claim 14, wherein the RGB reconversion module further comprises circuitry for removing the normalizing offset from the R, G, and B components of the resulting RGB data to produce the RGB output data.

16. The video graphics circuit of claim 15, wherein the RGB reconversion module further comprises a clamping circuit operably coupled to receive the resulting RGB data and to clamp at least one of the R, G, and B components of the resulting RGB data when the at least one the R, G, and B components is of a value that exceeds the normalized value range of the RGB data.

17. The video graphics circuit of claim 14, wherein the second color base conversion module includes firmware that removes the normalized offset from the resulting RGB data to produce the YUV output data.

18. A method for providing graphics and video data, the method comprises the steps of:
   a) generating expanded RGB data from received RGB data;
   b) generating RGB representative data from received YUV data, wherein the RGB representative data is of a similar format as the expanded RGB data, and wherein the RGB representative data has a value range that includes and exceeds a normalized value range of the received RGB data;
   c) mixing the RGB representative data and the expanded RGB data to produce resulting RGB data; and
   d) converting the resulting RGB data into YUV output data.

19. The method of claim 18 further comprises:
   generating second expanded RGB data from received second RGB data; and mixing the second expanded RGB data with the expanded RGB data and with the RGB representative data.

20. The method of claim 18 further comprises:
   generating second RGB representative data from received second YUV data; and
   mixing the second RGB representative data with the RGB representative data and the expanded RGB data.

21. The method of claim 18 further comprises generating the expanded RGB data by padding at least one bit to the received RGB data.

22. The method of claim 21 further comprises mixing the expanded RGB data and the RGB representative data in a sign dependent manner.

23. The method of claim 21 further comprises removing at least one bit from the resulting RGB data to produce the RGB output data.

24. The method of claim 21 further comprises clamping at least one of R, G, and B components of the resulting RGB data when the at least one R, G, and B component is of a value that exceeds the normalized value range of the received ROB data.

25. The method of claim 21 further comprises converting the RGB output data into the YUV output data in a sign dependent manner.

26. The method of claim 18 further comprises generating the expanded RGB data by adding a normalizing offset to R, G, and B components of the received RGB data.

27. The method of claim 26 further comprises adding a normalizing offset to R, G, and B components of the RGB representative data.

28. The method of claim 27 further comprises mixing the expanded RGB data with the RGB representative data in a sign independent manner.

29. The method of claim 28 further comprises:
   converting the resulting RGB data into RGB output data, wherein the RGB output data has the normalized value range of the received RGB data; and
   removing the normalizing offset from the R, G, and B components of the resulting RGB data to produce the RGB output data.

30. The method of claim 29 further comprises clamping at least one of the R, G, and B components of the resulting RGB data when the at least one the R, G, and B components is of a value that exceeds the normalized value range of the received RGB data.

31. The method of claim 28 further comprises removing the normalizing offset from the resulting RGB data to produce the YUV output data.

32. A video graphics circuit comprises:
   a processing module; and
   memory operably coupled to the processing module, wherein the memory stores operational instructions that cause the processing module to (a) generate expanded RGB data from received RGB data; (b) generate RGB representative data from received YUV data, wherein the RGB representative data is of a similar format as the expanded RGB data, and wherein the RGB representative data has a value range that includes and exceeds a normalized value range of the received RGB data; (c) mix the RGB representative data and the expanded RGB data to produce resulting RGB data; and (d) convert the resulting RGB data into YUV output data.

33. The video graphics circuit of claim 32, wherein the memory further comprises operational instructions that cause the processing module to:
   generate second expanded RGB data from received second RGB data; and
   mix the second expanded RGB data with the expanded RGB data and with the RGB representative data.

34. The video graphics circuit of claim 32, wherein the memory further comprises operational instructions that cause the processing module to:
   generate second RGB representative data from received second YUV data; and
   mix the second RGB representative data with the RGB representative data and the expanded RGB data.

35. The video graphics circuit of claim 32, wherein the memory further comprises operational instructions that cause the processing module to generate the expanded RGB data by padding at least one bit to the received RGB data.

36. The video graphics circuit of claim 35, wherein the memory further comprises operational instructions that cause the processing module to mix the expanded RGB data and the RGB representative data in a sign dependent manner.

37. The video graphics circuit of claim 35, wherein the memory further comprises operational instructions that cause the processing module to remove at least one bit from the resulting RGB data to produce the RGB output data.

38. The video graphics circuit of claim 35, wherein the memory further comprises operational instructions that cause the processing module to clamp at least one of R, G, and B components of the resulting RGB data when the at least one R, G, and B component is of a value that exceeds the normalized value range of the received RGB data.

39. The video graphics circuit of claim 35, wherein the memory further comprises operational instructions that cause the processing module to convert the RGB output data into the YUV output data in a sign dependent manner.

40. The video graphics circuit of claim 32, wherein the memory further comprises operational instructions that cause the processing module to generate the expanded RGB data by adding a normalizing offset to R, G, and B components of the received RGB data.

41. The video graphics circuit of claim 40, wherein the memory further comprises operational instructions that cause the processing module to add a normalizing offset to R, G, and B components of the RGB representative data.

42. The video graphics circuit of claim 41, wherein the memory further comprises operational instructions that cause the processing module to mix the expanded RGB data with the RGB representative data in a sign independent manner.

43. The video graphics circuit of claim 42, wherein the memory further comprises operational instructions that cause the processing module to remove the normalizing offset from the R, G, and B components of the resulting RGB data to produce the RGB output data.

44. The video graphics circuit of claim 43, wherein the memory further comprises operational instructions that cause the processing module to clamp at least one of the R, G, and B components of the resulting RGB data when the at least lone the R, G, and B components is of a value that exceeds the normalized value range of the received RGB data.

45. The video graphics circuit of claim 41, wherein the memory further comprises operational instructions that cause the processing module to remove the normalizing offset from the resulting RGB data to produce the YUV output data.

* * * * *